United States Patent [19]

Nelson et al.

[11] Patent Number: 4,675,154

[45] Date of Patent: Jun. 23, 1987

[54] NUCLEAR FUEL ASSEMBLY WITH LARGE COOLANT CONDUCTING TUBE

[75] Inventors: Harold L. Nelson; Thomas G. Dunlap; Eric B. Johansson; Bruce Matzner, all of San Jose, Calif.

[73] Assignee: General Electric Company, San Jose, Calif.

[21] Appl. No.: 811,726

[22] Filed: Dec. 20, 1985

[51] Int. Cl.⁴ ............................................. G21C 3/32
[52] U.S. Cl. ................................. 376/444; 376/439; 376/443
[58] Field of Search ............... 376/439, 443, 444, 447

[56] References Cited

U.S. PATENT DOCUMENTS 4,420,458 12/1983 Dunlap .............................. 376/447

FOREIGN PATENT DOCUMENTS

644866 7/1964 Belgium .............................. 376/444
54-144584 11/1979 Japan ................................. 376/444
59-52999 12/1984 Japan ................................. 376/444

Primary Examiner—Donald P. Walsh
Attorney, Agent, or Firm—Ivor J. James, Jr.; Raymond G. Simkins

[57] ABSTRACT

In a nuclear reactor fuel assembly, a relatively flexible mounting member for mounting a large coolant conducting tube to the lower tie plate whereby excessive side forces on the fuel rod spacers are avoided in the event of lateral displacement of the fuel assembly such as during a seismic event.

20 Claims, 10 Drawing Figures

NUCLEAR FUEL ASSEMBLY WITH LARGE COOLANT CONDUCTING TUBE

BACKGROUND

In known types of nuclear power reactors, for example in a boiling water reactor (BWR) as used in the Dresden Nuclear Power Station near Chicago, Illinois, the reactor core comprises a Plurality of spaced fuel assemblies arranged in an array capable of self-sustained nuclear fission reaction. The core is contained in a pressure vessel wherein it is submerged in a working fluid, such as light water, which serves both as coolant and as a neutron moderator. Each fuel assembly comprises a removable tubular flow channel, typically of approximately square cross section, surrounding an array of elongated, cladded fuel elements or rods containing suitable fuel material, such as uranium or plutonium oxide, supported between upper and lower tie plates. The fuel assemblies are supported in a spaced array in the pressure vessel between an upper core grid and a lower core support. The lower tie plate of each fuel assembly is formed with a nose piece which fits in a support socket for communication with a pressurized coolant supply chamber. The nose piece is formed with openings through which the pressurized coolant flows upward through the fuel assembly flow channels to remove heat from the fuel elements. A typical fuel assembly of this type is shown, for example, by B. A. Smith et al in U.S. Pat. No. 3,689,358. An example of a fuel element or rod is shown in U.S. Pat. No. 3,378,458.

Additional information on nuclear power reactors may be found, for example, in "Nuclear Power Engineering", M. M. El-Wakil, McGraw-Hill Book Company, Inc., 1962.

A typical fuel assembly is formed, for example, by an array of spaced fuel rods supported between upper and lower tie plates, the rods being several feet in length, on the order of one-half inch in diameter and spaced from one another by a fraction of an inch. To provide proper coolant flow past the fuel rods it is important to maintain the fuel rods in fixed spaced relation and restrain them from bowing and vibrating during reactor operation. A plurality of fuel rod spacers positioned in spaced relation along the length of the fuel assembly are provided for this purpose. Such spacers are shown, for example, by B. Matzner et al in U.S. Pat. No. 4,508,679.

In a typical BWR the fuel assemblies are spaced apart, as shown for example by J. R. Fritz et al in U.S. Pat. No. 3,802,995. This leaves gaps or channels between fuel assemblies which are filled with relatively cool water-moderator. Thus the peripheral fuel rods of the fuel assemblies are exposed to neutrons of relatively low thermal energy which are more likely to cause fission in the fuel whereas the fuel rods in the inner region of the fuel assemblies are exposed to neutrons of higher thermal energy.

Also, boiling in the upper part of the BWR core reduces neutron moderation in the upper regions of the fuel assemblies.

Because they are exposed to a relatively greater amount of low energy thermal neutrons the peripheral fuel rods tend to produce relatively more power and hence have higher heat flux than the fuel rods in the inner region. To aid cooling of the peripheral fuel rods and mixing of the water flow through the fuel assembly, inwardly bent flow deflecting tabs can be added to the peripheral support band of the fuel rod spacers. Such vanes are shown, for example, by R. J. Creagan et al in U.S. Pat. No 4,061,536.

Unequal moderator-to-fuel ratio can be alleviated by use of "part-length" fuel rods which extend only over the lower (unvoided) region of the fuel assembly as discussed, for example, by S. Untermyer in U.S. Pat. No. 2,998,367.

To alleviate the unequal neutron moderation caused by the water channels surrounding each fuel assembly and the boiling in the upper region of the fuel core, one or more central fuel rods can be replaced by water conducting tubes which convey unvoided water to the upper region of the fuel assembly. Such arrangements are shown, for example, in the previously mentioned U.S. Pat. No. 3,802,995 and by T. G. Dunlap et al in U.S. Pat. No. 4,420,458. In these two patents the water tubes are of about the same diameter as that of the fuel rods.

The idea of using a large water tube (e.g. one which replaces four fuel rods) is also known as shown, for example, by J. M. West et al in U.S. Pat. No. 3,132,076 (FIG. 5) and by B. Fredin in U.S. Pat. No. 3,808,098.

However, use of such a large water tube presents problems not addressed or solved by the prior art. Such a large water tube is inherently quite rigid (as compared to the smaller diameter fuel rods). Thus if such a large water tube is secured to the lower tie plate, it constitutes a relatively rigid member traversing the fuel assembly through passages in the fuel rod spacers.

If the fuel assembly is subjected to transverse loads such as during a seismic event it is generally assumed that the lower tie plate and nose piece of the assembly remains seated in its support socket while the upper portion of the assembly may experience lateral displacement. In such a case, the relatively stiff large water tube can subject the fuel rod spacers to lateral loads beyond the capability of the spacers (particularly the lower most spacer).

It is an object of the invention to provide practical arrangements for use of a large water tube in a nuclear fuel assembly.

Another object is an improved nuclear fuel assembly which tends to equalize neutron moderation, improve heat transfer and minimize coolant pressure drop.

Another object is a large water tube mounting arrangement which avoids excessive lateral loads on the fuel rod spacers.

SUMMARY

These and other objects of the invention are achieved by the use of an elongated, relatively flexible large water tube mounting member for mounting the large water tube on the lower tie plate of the fuel assembly, such mounting member thus allowing lateral displacement of the upper end of the large water tube without excessive forces on the fuel rod spacers. The large water tube is fitted with radially extending lugs above and below each spacer to retain the spacers in their axial positions.

In one embodiment, the mounting member is secured at its bottom end to the lower tie plate, the large water tube is terminated at or near the top of the fuel zone and the area of the upper tie plate above the large water tube is open to decrease coolant pressure drop.

In another embodiment, the large water tube is supported between the upper and lower tie plates. The flexible mounting member of this embodiment is in the form of a tube having openings therein near the bottom of the fuel assembly for flow of subcooled water thereinto and upward into the large water tube having water exit openings at or near the top of the fuel zone. An upper support member or extension of smaller diameter fitted to the top of the large water tube engages a support cavity in the upper tie plate.

Other features include the use of ferrule type of fuel rod spacers for low coolant pressure drop, the provision of coolant flow deflecting tubes on the peripheral support band of the spacers for coolant mixing and improved heat transfer from the surfaces of the peripheral fuel rods, and part-length fuel rods which tend to equalize moderator-to-fuel ratio as well as decrease coolant pressure drop through the fuel assembly.

DRAWING

The invention is described more specifically hereinafter with reference to the accompanying drawing wherein.

DESCRIPTION

Figure 1:
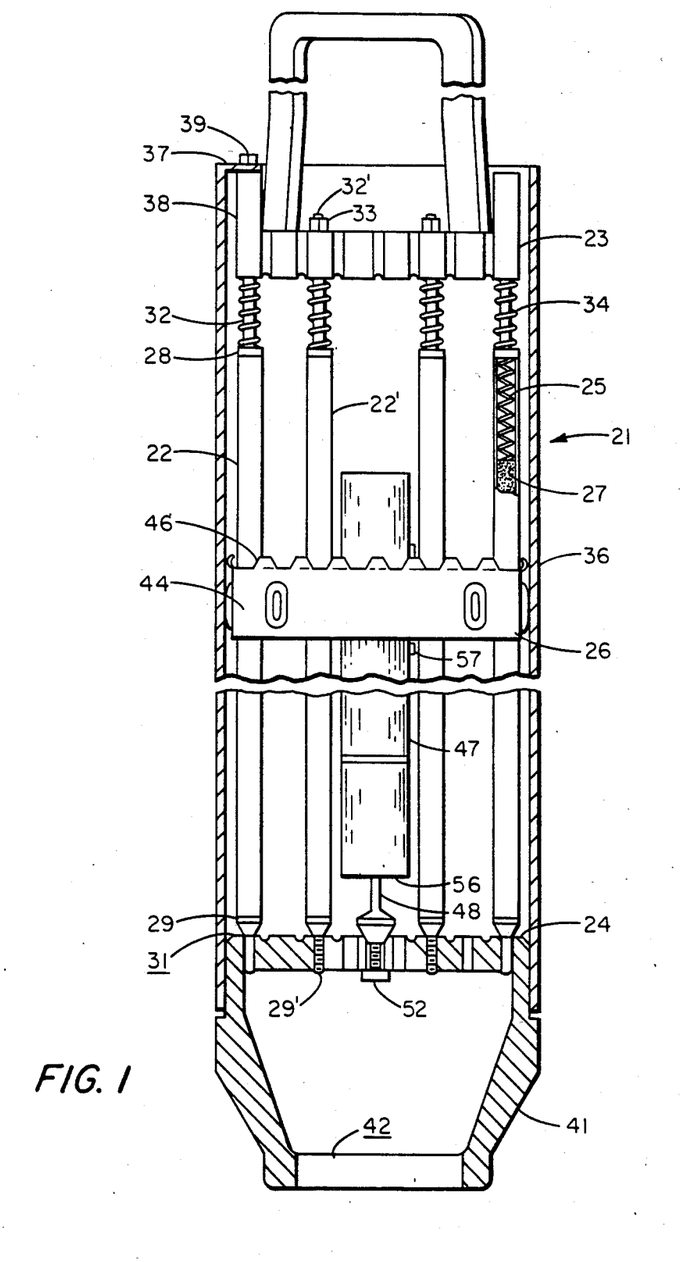
FIG. 1 is a longitudinal section view of a fuel assembly with a large water tube support arrangement of an embodiment of the invention.

As illustrated in FIG. 1, a fuel assembly 21 comprises a plurality of spaced fuel rods 22 supported between an upper tie plate 23 and a lower tie plate 24. (An 8 x 8 array is illustrated but for clarity of illustration only some of the fuel rods 22 are shown). The fuel rods 22 pass through a plurality of fuel rod spacers 26 (only one of which is shown in FIG. 1) which provide intermediate support to retain the elongated rods in spaced relation and restrain them from lateral vibration.

Each of the fuel rods 22 is formed of an elongated tube containing a column of nuclear fuel 27. A plenum at the upper end of the fuel rod contains a spring 25 which retains the column of fuel in position. The fuel rods 22 are sealed by upper and lower end plugs 28 and 29. Lower end plugs 29 are formed with a taper for registration and support in cavities 31 in the lower tie plate 24. Upper end plugs 28 are formed with extensions 32, the upper ends of which fit into support cavities in the upper tie plate 23.

Several of the support cavities 31 (for example, selected ones of the peripheral cavities) in the lower tie plate 24 are formed with threads to receive the end plugs of tie fuel rods 22' having threaded end plug shanks 29'. Extensions 32' of the end plugs 28 of these same fuel rods are elongated to pass through the cavities in the upper tie plate 23 and are formed with threads to receive retaining nuts 33. Fitted on the extensions 32 between the upper end plugs 28 and the upper tie plate 23 are expansion springs 34. In this manner the upper and lower tie plates and the fuel rods are formed into a unitary structure.

The fuel assembly 21 further includes an open-ended, thin-walled, tubular flow channel 36, of substantially square cross section, sized to form a sliding fit over the outsides of upper and lower tie plates 23 and 24 and the spacers 26 so that the channel 36 readily can be mounted and removed. Fixed to a top corner of the channel 36 is a tab 37 by which the channel 36 is fastened to a standard 38 of the upper tie plate 23 by a screw 39. Since the channel 36 is not fastened to the lower tie plate 24, the upper end of the channel 36 is free to move with respect to the lower tie plate 24 in the event of movement of the upper end of the fuel assembly 21.

The lower tie plate 24, is formed with a downwardly extending nose piece 41 which is tapered to engage a fuel assembly support socket (not shown). The lower end of the nose piece 41 is formed with an opening 42 to receive pressurized water (as coolant/moderator) so that it flows upward among the fuel rods.

The fuel rod spacers 26 are preferably of the tubular ferrule type, because of their favorably low coolant pressure drop, as shown and described in detail in the previously mentioned U.S. Pat. No. 4,508,679. Additionally, the peripheral support band 44 of the spacer 26 advantageously is formed with upwardly extending, inwardly bent coolant flow deflecting tabs 46. (See also FIG. 9). The flow deflecting tabs 46 tend to deflect the relatively cooler water traveling upward along the inner surface of the flow channel 36 inward onto the surfaces of the outer or peripheral fuel rods 22. This aids cooling of and heat transfer from these fuel rods and allows greater heat production therefrom without exceeding thermal limits.

To aid in equalizing neutron moderation, the fuel assembly 21 is fitted with a large water tube 47 for conveying relatively cool water upward through the central region of the fuel assembly. As illustrated in FIG. 1 (see also FIG. 9) the large water tube 47 occupies the space of four fuel rods. As discussed briefly hereinbefore, a problem with the use of a large water tube is to provide a mounting arrangement which prevents overloading of the spacers by the large water tube in the event of lateral displacement of the fuel assembly 21 such as during a seismic event.

Figure 2:
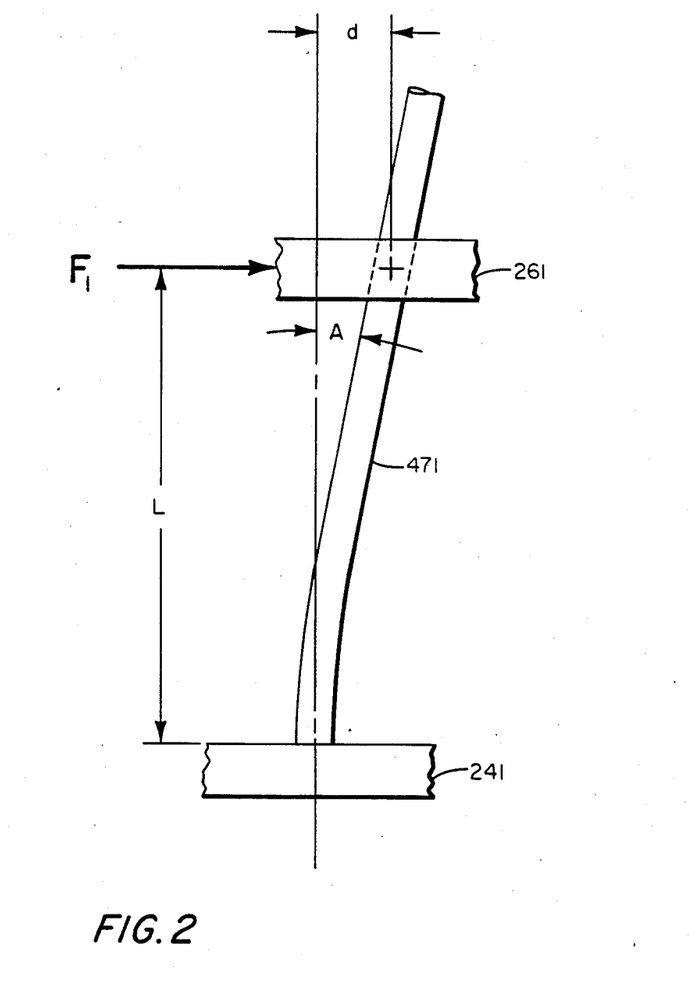
FIG. 2 is a schematic illustration of side force imposed on the fuel rod spacer by the large water tube.

Before describing the large water tube mounting arrangement of the invention, reference is made to FIG. 2 for further discussion of the problem. FIG. 2 schematically illustrates a lower tie plate 241 to which is firmly secured a large water tube 471, this large water tube passing through a spacer 261 spaced a distance L from the lower tie plate 241.

If the fuel assembly, of which these components are a part, is laterally displaced at its upper end and the large water tube 471 is displaced to the right from its center line an amount d (measured at the axial center line of the spacer 261) then the large water tube is deflected through an angle A with the result that a force $F_1$ is exerted on the spacer 261. The resulting spacer side load $F_1$ is determined by the following relationship:

$$F_1 = \frac{12 EI}{L^3}\left[d - \frac{LA}{2}\right] \quad (1)$$

where:
E is modulus of elasticity of the tube 471,
I is section modulus of the tube 471,
L is the distance from the tie plate 241 to the axial center line of spacer 261,
d is the lateral displacement of the tube 471 from its normal center line (measured at the axial center line of lowest spacer 261, and
A is the angle of deflection.

For a large water tube 471 formed of zirconium alloy with an outside diameter of about 1.35 inches (3.4 cm) and a wall thickness of about 0.04 inches (1 mm), a deflection d of about 0.5 inches (1.3 cm) at a length L of about 20 inches (50.8 cm) results in a spacer side load $F_1$, of about 160 lbs (73 kg). This greatly exceeds the normal design capability of the spacer 261 which is in the order of 15 lbs. (6.8 kg) maximum.

Figure 3:
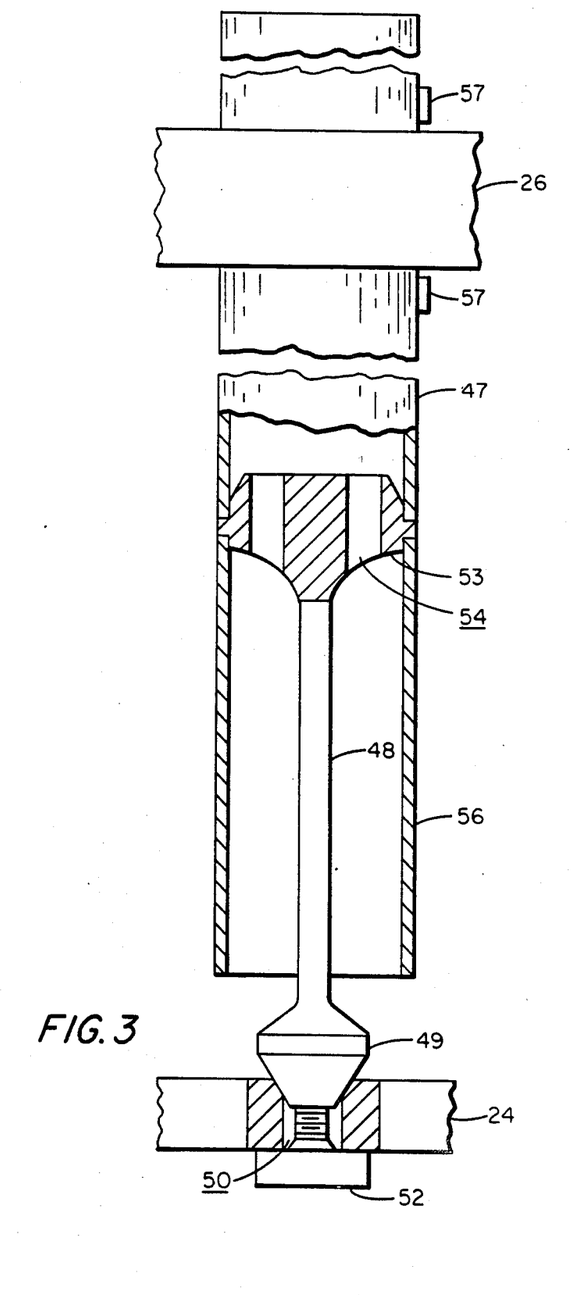
FIG. 3 is an elevation view, partly in section, of the large water tube mounting arrangement of the embodiment of FIG. 1.

To avoid such excessive loads on the spacers 26, the large water tube 47 is, according to this invention, mounted on the lower tie plate 24 by use of a relatively flexible mounting member 48 shown in FIG. 1 and in greater detail in FIG. 3. In this version the member 48 is in the form of a rod having an enlarged or flanged lower end portion 49 which is tapered at its lower end and fitted into a similarly tapered cavity 50 in the lower tie plate 24. The flanged end portion 49 is drilled and tapped to receive a screw 52 by which the mounting member 48 is secured to the tie plate 24.

At its upper end, the member 48 is formed with an upper flanged portion 53 having an upper outer surface machined to receive the lower end of the large water tube 47 to which it is attached as by welding. The flanged portion 53 is formed with passages 54 for admitting water into the tube 47. A lower outer surface of the flanged portion 53 is machined to receive a downwardly extending tubular skirt 56 and attached thereto as by welding. The skirt 56 assures that only water near the bottom of the fuel assembly, where it is relatively cool, is admitted into the large water tube 47.

At the axial position of each spacer 26, the water tube 47 is fitted with a pair of spaced, radially extending lugs 57 which limit axial movement of the spacers 26 and thus retains them in proper axial position. (How the spacers 26 are captured and mounted on the water tube 47 is discussed in further detail hereinafter).

Figure 4:
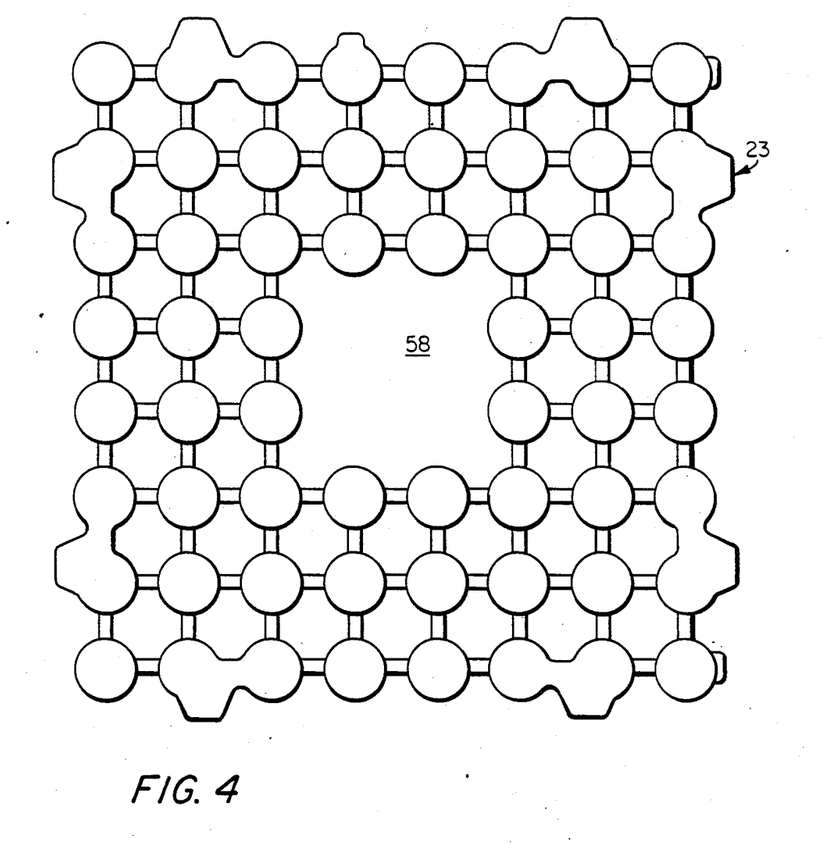
FIG. 4 is a plan view of the upper tie plate of the fuel assembly of FIG. 1.

As shown in FIG. 1, the large water tube 47 extends only to about the top of fuel 27 in the fuel rods 22 since unvoided water for additional neutron moderation is not needed above this point. Also, as shown in FIG. 4, the webs and bosses that would be needed for the four fuel rods which the large water tube 47 replaces are omitted from the upper tie plate 23 to provide a large opening 58 for exit of steam and water from the fuel assembly. Termination of the water tube 47 at the top of the column of fuel and the opening 58 in the upper tie plate both contribute to lower coolant pressure drop in passage of the coolant through the fuel assembly 21.

Figure 5:
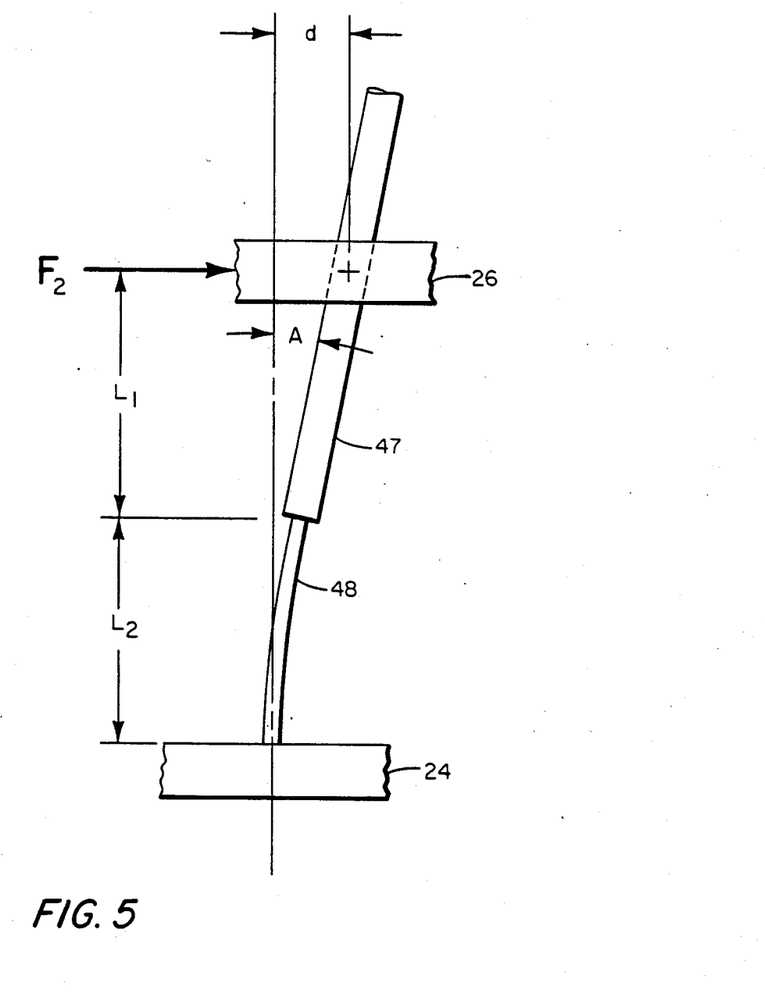
FIG. 5 is a schematic illustration of the large water tube mounting arrangement of the invention illustrating the reduction in side force on the fuel rod spacer.

FIG. 5 schematically illustrates action of the flexible mounting member 48 in avoiding excessive side forces on the spacers 26. Since the member 48 is designed to bend much more readily than the water tube 47, it can be assumed that the member 48 will take essentially all of the bending load.

Then the resulting spacer side load F2 is determined by the following relationship:

$$F_2 = \frac{d - L_1 A}{\frac{(L_2)^3}{3(EI)} + \frac{(L_1 L_2^2)}{2(EI)}} \quad (2)$$

where:
E is the modulus of elasticity of the member 48,
I is the section modulus of the member 48,
d is the postulated lateral displacement of tube 47, during for example a seismic event, from its normal center line (as measured at the axial center line of the lowest spacer 26),
$L_1 + L_2$ is the distance from the lower tie plate 24 to the axial center line of spacer 26,
$L_2$ is the length of flexible member 48, and
A is the angle of deflection.

Using this relationship, various material, diameter and length combinations for the member 48 can be evaluated to determine a practical combination which suitably will limit the side force $F_2$ on the spacer. For example, a practical combination was found to be a member 48 formed of zirconium alloy with a diameter of about 0.25 inches (0.6 cm) and a length of about 5 inches (12.7 cm). For a postulated displacement d of 0.5 inches (1.27 cm), this limits the side force on the spacer 26 to about 5 lbs. (2.27 kg)—well within the spacer design limits.

Figure 6:
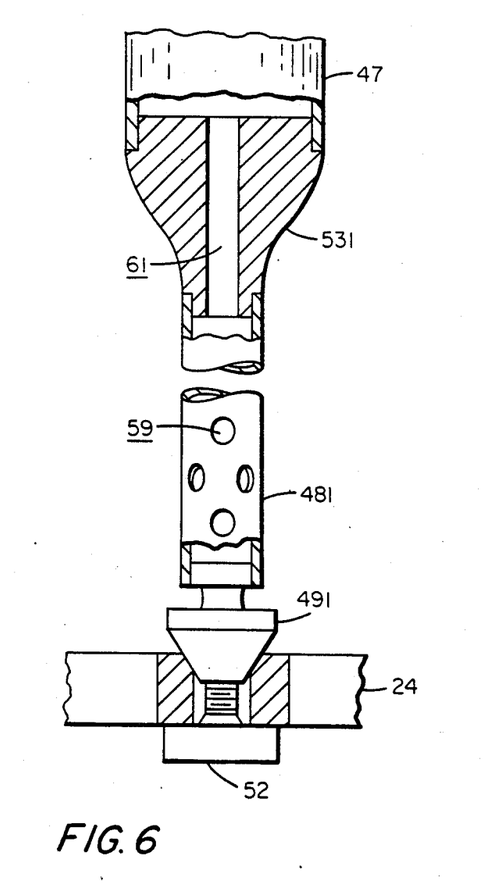
FIG. 6 is an elevation view, partly in section, of the alternate version of the large water tube mounting arrangement of the embodiment of FIG. 1.

An alternate form of a water tube mounting member is illustrated in FIG. 6. In this version a flexible mounting member 481 is tubular in form and is fitted at its lower end with a tapered end plug 491 which is secured by screw 52 to lower tie plate 24. Secured to the upper end of member 481 is a diameter transition member 531 which, in turn, is secured at its upper end to the large water tube 47 as by welding.

Formed in the lower end of member 481 is a plurality of holes 59 for admitting coolant into member 481 and thence through a passage 61 into large water tube 47. A practical diameter wall thickness and length to provide a spacer side load within design limits can be determined by use of relationship (2) set forth hereinbefore. For example, the tubular member 481 may be formed of a zirconium alloy with an outside diameter of about 0.60 inches (1.5 cm) and a wall thickness of about 0.03 inches (0.76 mm) and a length in the order of 15 inches (38 cm).

Figure 7:
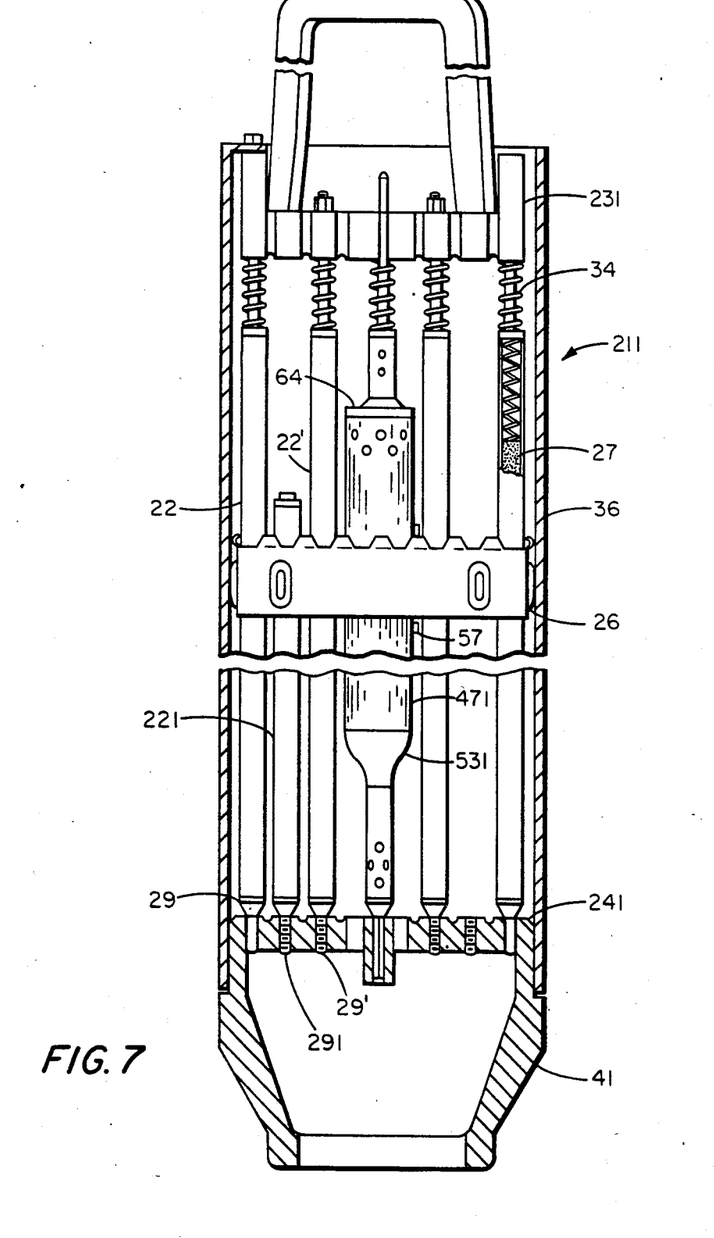
FIG. 7 is a longitudinal section view of a fuel assembly with another embodiment of the large water tube mounting arrangement of the invention.
Figure 8A:
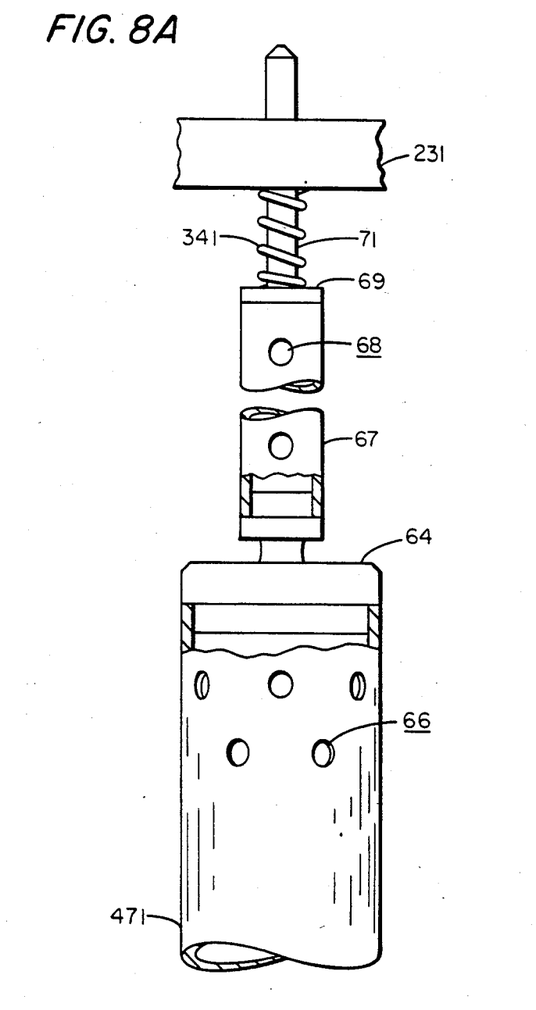
FIGS. 8A and 8B taken together is an elevation view, partly in section of the large water tube mounting arrangement of the embodiment of FIG. 7.
Figure 8B:
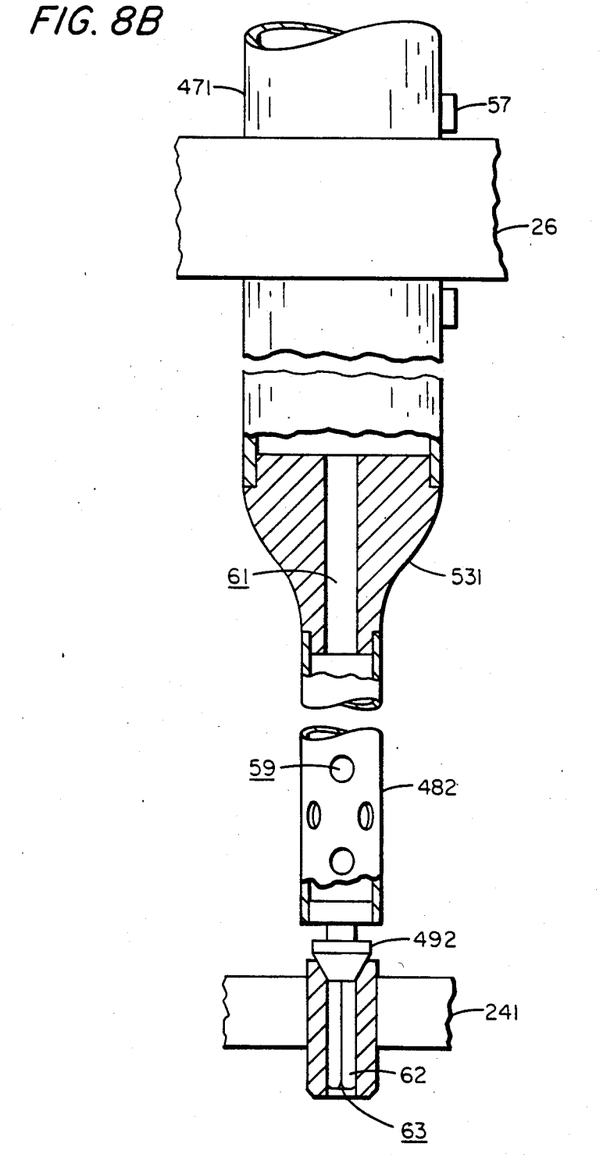

An alternate embodiment of a large water tube support arrangement of the invention is illustrated in FIG. 7 and in FIGS. 8A and 8B taken together. (Parts in these figures similar to parts shown in previous figures are given the same reference numbers).

A fuel assembly 211 of this embodiment is similar to the previously described fuel assembly 21 of FIG. 1 except for the mounting arrangement of the large water tube 471. At its lower end the water tube 471 (see FIG. 8B) is supported on lower tie plate 241 by a tubular flexible support member 482 similar in design and construction to the previously described member 481 of FIG. 6. The difference is that instead of being secured to the lower tie plate with a screw, the lower end plug 492 of this embodiment is formed with an elongated, downward extending shank 62 which is fitted into an extended, mating cavity 63 in the lower tie plate 241. The shank 62 is formed with, for example, a square cross section and the cavity 63 with a matching shape to prevent rotation of water tube which might disengage the spacer retaining lugs from the spacer 26 as explained in greater detail in the previously mentioned U.S. Pat. No. 3,802,995. The shank 62 and cavity 63 are elongated, as compared to the lower end plug shanks of the fuel rods 22, to prevent disengagement from the lower tie plate 241 in the event of differential axial expansion with respect to fuel rods as discussed in detail in previously mentioned U.S. Pat. No. 4,420,458.

Being secured at its lower end to the end plug 492, the support member 482 is secured at its upper end to the large water tube 471 through the agency of transition member 531 while holes 59 and passage 61 provide an inlet for water into the tube 471.

A practical design for the flexible support member 482 (that is, its diameter, wall thickness and length for a selected material) can be determined by use of relationship (2) set forth hereinbefore. In a practical example the member 482 is formed of a zirconium alloy with an outside diameter of about 0.60 inches (1.5 cm), a wall thickness of about 0.03 inches (0.76 mm) and a length of about 15 inches (38 cm).

As shown in FIG. 8A, the large water tube 471 is terminated in the region of the top of the fuel 27 (FIG. 7) and is fitted at its upper end with an upper support member including a transition piece 64 to which it is secured as by welding. Formed in the upper end of water tube 471 is a plurality of holes 66 which provide an exit for the water flowing therein near the upper end of fuel 27 since additional neutron moderation above the fuel 27 is not needed and termination of the large water tube 471 at this elevation reduces coolant pressure drop.

Secured to the upper end of transition piece 64 is an upper support member or extension 67, illustrated as a section of tubing preferably formed of a zirconium alloy and of a diameter similar to that of the fuel rods 22 or support member 482. (Holes 68 in extension tube 67 relieve the tube from external-internal pressure differential). At its upper end the extension 67 is fitted with an end plug 69 which is formed with an elongated shank 71 extending through a support cavity in the upper tie plate 231. Fitted on the shank 71, between the end plug 69 and the upper tie plate 231, is an expansion spring 341. The shank 71 extends above the upper tie plate to prevent disengagement therefrom in the event of differential expansion with respect to the fuel rods and the spring 341 may be formed with several close spaced turns to limit upward movement of the water tube as discussed in previously mentioned U.S. Pat. No. 4,420,458.

An advantage of the large water tube embodiment of FIG. 7 (as compared to the embodiment of FIG. 1) is that the large water tube assembly thereof can be installed and removed without access to the under side of the lower tie plate 241.

Also illustrated in FIG. 7 is the use of part-length fuel rods 221. The sealed fuel rods 221 may be about one-third to about two-thirds the length of the normal or full length fuel rods 22 but preferably about one-half. To secure the fuel rods 221 in the fuel assembly 211, the shanks of the lower end plugs 291 thereof may be threaded to engage threaded support cavities in the lower tie plate 241. To assure tight engagement, these threads may be formed with a taper.

Figure 9:
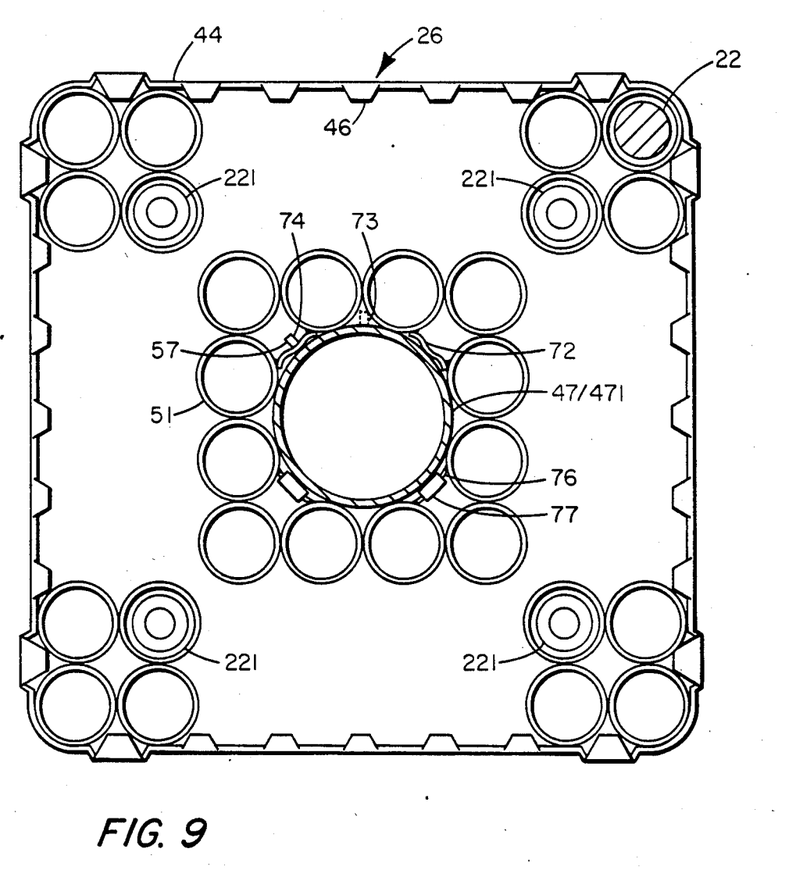
FIG. 9 is a plan view of a fuel rod spacer as adapted to accommodate the large water tube.

FIG. 9 is a plan view (with some parts omitted) of the spacer 26 which shows, among other things, a preferred radial location of the part-length fuel rods 221. Preferably the fuel rods 221 are located inward from the peripheral fuel rods. In the case illustrated, there are four part-length fuel rods 221 located next inward from the corner fuel rods 22.

The advantages provided by the part-length fuel rods are several as discussed in greater detail in the previously mentioned U.S. Pat. No. 2,998,367. The increase in coolant flow area in the upper part of the fuel assembly decreases coolant pressure drop. The decrease in the amount of fuel in the upper part of the fuel assembly where the cold shutdown reactivity peaks, increases the cold shutdown reactivity margin.

Other features shown in FIG. 9 are the coolant flow deflecting tabs 46 and modification of the spacer 26 to accommodate the large water tube 47/471. (Only some of the ferrules 51, in simplified form, which form the spacer 26 are shown in FIG. 9. For a more complete description of such a spacer and the details thereof, see the previously mentioned U.S. Pat. No. 4,508,679).

To accommodate the large water tube 47, the four central ferrules of the spacer 26 are omitted. A pair of straps 72, formed with a generally M cross section shape, and extending over the length of the ferrules, are each secured (as by welding) to one of a spaced pair of the ferrules 51 surrounding the water tube 47. The straps 72 serve several purposes. They reinforce the spacer 26. They serve as relatively rigid stops to laterally locate the water tube 47 and one of the straps 72 cooperates with the spacer retaining lugs 57 to retain the spacer 26 in its proper axial location.

To illustrate the latter function, a retaining lug 57 is shown in dashed lines in a first radial position 73 intermediate between straps 72. In this radial position the water tube 47 can be inserted through spacer 26 to where the spacer is between a pair of the retaining lugs 57 (see for example FIG. 3). Once in this axial position, the water tube 47 and spacer 26 are rotated with respect to one another (45 degrees) until one of the straps 72 is between the pair of lugs 57 in which radial position 74 the lugs 57 can now engage the strap 72 to limit axial displacement of the spacer 26.

In the embodiment of FIG. 1, the water tube 47 is secured in its spacer retaining position by securing screw 52. In the embodiment of FIG. 7, rotation of the water tube 471 is prevented by insertion of its shaped end plug shank 62 (FIG. 8B) in the shaped cavity 63 of lower tie plate 241.

Opposite the straps 72 a further pair of straps 76 (having a generally U shape) are secured between adjacent ferrules 51. Mounted on each strap 76 is a suitable spring member 77 for preventing vibration by maintaining the water tube 47 in contact with straps 72.

Thus what has been described is an improved nuclear fuel assembly with practical arrangements for utilizing a large water tube therein.

What is claimed:

1. A fuel assembly for a nuclear reactor comprising a plurality of elongated fuel rods each containing a column of nuclear fuel;

support means providing a plurality of support positions for retaining said fuel rods in spaced array including a lower tie plate engaging the lower ends of said fuel rods;

a nose piece extending from said lower tie plate and forming a coolant receiving chamber;

a large diameter elongated coolant conducting tube extending upward through said assembly and occupying the space of a plurality of said fuel rods, said coolant conducting tube having an opening at its lower end for receiving coolant and an opening at its upper end for discharging coolant;

at least one spacer axially positioned intermediate between the upper and lower ends of said fuel rods for laterally supporting said fuel rods and said coolant conducting tube;

and a mounting member for said large diameter coolant conducting tube, the lower end of said mounting member engaging said lower tie plate and the upper end of said mounting member being secured to the lower end of said coolant conducting tube, said mounting member having a relatively small diameter and being relatively flexible compared to said large diameter coolant conducting tube whereby in the event of lateral displacement of the upper end of said large diameter coolant conducting tube, excessive lateral forces on said spacer are avoided.

2. The fuel assembly of claim 1 wherein said mounting member is formed with an enlarged tapered lower end engaging a tapered support cavity in said lower tie plate and secured thereto with a screw.

3. The fuel assembly of claim 1 wherein said mounting member is formed with an enlarged upper end secured to the lower end of said coolant conducting tube, said enlarged upper end being formed with at least one passage for admitting coolant into said coolant conducting tube.

4. The fuel assembly of claim 3 including a tubular skirt secured to said enlarged upper end of said mounting member and extending downward around said mounting member whereby only coolant near the lower end of said assembly is admitted to said coolant conducting tube.

5. The fuel assembly of claim 1 wherein said coolant conducting tube is open at its upper end and said upper end extends to about the top of the fuel in said fuel rods.

6. The fuel assembly of claim 1 wherein said mounting member is in the form of a rod formed of zirconium alloy with a diameter of about 0.25 inches (0.6 cm) and a length of about 5 inches (12.7 cm).

7. The fuel assembly of claim 1 wherein said mounting member is a tubular mounting member with an outside diameter of about 0.60 inches (1.5 cm), a wall thickness of about 0.03 inches (0.76 mm) and a length of about 15 inches (38 cm), said tubular mounting member being formed with a plurality of holes near its lower end for admitting coolant thereinto and thence into said large coolant conducting tube.

8. The fuel assembly of claim 1 including an upper tie plate engaging the upper ends of said fuel rods and a large opening in said upper tie plate above said large coolant conducting tube, said opening having an area at least equal to the cross section area of said large coolant conducting tube.

9. The fuel assembly of claim 1 including an upper tie plate engaging the upper ends of said fuel rods and an upper support member for said coolant conducting tube, the upper end of said upper support member engaging said upper tie plate and the lower end of said upper support member being secured to the upper end of said coolant conducting tube.

10. The fuel assembly of claim 9 wherein said coolant conducting tube is terminated in the vicinity of the upper end of the fuel in said fuel rods and wherein said upper support member has a diameter significantly less than the diameter of said coolant conducting tube.

11. The fuel assembly of claim 10 including a diameter transition piece at the lower end of said upper support member secured to the upper end of said coolant conducting tube, an end plug at the upper end of said upper support member, said end plug being formed with an extended shank of reduced diameter, an expansion spring mounted on said extended shank between the lower end of said end plug and said upper tie plate, and a plurality of holes formed in the upper end of said coolant conducting tube at about the elevation of the upper end of the fuel in said fuel rods.

12. The fuel assembly of claim 11 wherein said mounting member for said coolant conducting tube comprises:

a section of tubing of a diameter significantly less than the diameter of said coolant conducting tube;

a diameter transition piece secured at its upper end to the lower end of said coolant conducting tube and at its lower end to said section of tubing;

an end plug secured to the lower end of said section of tubing and engaging said lower tie plate, said end plug being formed with an elongated extended shank of other than circular cross section shape fitted into a mating cavity in said lower tie plate whereby rotation of said mounting member and said coolant conducting tube from a predetermined radial position is prevented;

a plurality of holes formed in the lower end of said tubing for admitting coolant thereinto;

and an axially extending passage formed in said diameter transition piece for passage of coolant from said tubing into said coolant conducting tube.

13. The fuel assembly of claim 12 including a pair of axially spaced spacer retaining lugs secured to said coolant conducting tube and extending radially above and below said spacer for limiting axial displacement of said spacer when said coolant conducting tube is in said predetermined radial position.

14. The fuel assembly of claim 1 including a pair of axially spaced spacer retaining lugs secured to said coolant conducting tube and extending radially above and below said spacer for limiting axial displacement of said spacer when said coolant conducting tube is in a predetermined radial position.

15. The fuel assembly of claim 1 wherein said spacer is of the ferrule type having a peripheral support band formed with upwardly extending inwardly bent coolant flow deflecting tabs.

16. The fuel assembly of claim 1 including at least one part-length fuel rod mounted on said lower tie plate and extending between one-third and two-thirds the length of the full length fuel rods.

17. The fuel assembly of claim 16 wherein said part-length fuel rod has a length of about one-half that of the full length fuel rods.

18. The fuel assembly of claim 16 including four part-length fuel rods each located in a fuel rod position next inward from the corner fuel rods of said assembly.

19. In a nuclear fuel assembly including a plurality of fuel rods mounted on a lower tie plate and a spacer positioned intermediate the upper and lower ends of said fuel rods, an arrangement for mounting a large diameter coolant conducting tube having a diameter at least twice tht of said fuel rods on said lower tie plate comprising:

an elongated mounting member having a relatively small diameter between said lower tie plate and the lower end of said large diameter coolant conducting tube;

means for removably securing said lower end of said mounting member to said lower tie plate;

diameter transition means at the upper end of said relatively small diameter mounting member secured to the lower end of said large diameter coolant conducting tube; for at least one coolant passage through said transition means for admitting coolant into said large diameter coolant conducting tube, the length, the material, the modulus of elasticity and the section modulus of said relatively small diameter mounting member being selected so that said mounting member is relatively flexible compared to said large diameter coolant conducting tube whereby in the event of lateral displacement of the upper portion of said large diameter coolant conducting tube, excessive lateral forces on said spacer are avoided.

20. In a nuclear fuel assembly including a plurality of fuel rods supported between a lower tie plate and an upper tie plate and having at least one spacer positioned intermediate said lower and upper tie plates, an arrangement for mounting a large diameter coolant conducting tube having a diameter at least twice that of said fuel rods on said lower tie plate comprising:

an upper support member secured to the upper end of said coolant conducting tube and including an extending shank engaging a supporting cavity in said upper tie plate;

an elongated mounting member having a relatively small diameter between said lower tie plate and the lower end of said large diameter coolant conducting tube;

means at the lower end of said mounting member for engaging a support cavity in said lower tie plate;

diameter transition means at the upper end of said relatively small diameter mounting member secured to the lower end of said large diameter coolant conducting tube;

at least one coolant passage through said transition means for admitting coolant into said large diameter coolant conducting tube, the length, the material, the modulus of elasticity and the section modulus of said relatively small diameter mounting member being selected so that said mounting member is relatively flexible compared to said large diameter coolant conducting tube whereby in the event of lateral displacement of the upper portion of said large diameter coolant conducting tube, excessive lateral forces on said spacer are avoided.

* * * * *